INVENTOR.
FREDERICK B. SMALL
BY
Chas. T. Hawley
ATTY.

Oct. 2, 1951  F. B. SMALL  2,569,585
POWER ACTUATOR WITH PILOT CONTROL
Filed May 7, 1949  3 Sheets-Sheet 3

INVENTOR.
FREDERICK B. SMALL
BY
Chas. T. Hawley
ATTY.

Patented Oct. 2, 1951

2,569,585

UNITED STATES PATENT OFFICE 2,569,585

POWER ACTUATOR WITH PILOT CONTROL

Frederick B. Small, Waterloo, N. Y., assignor to Seneca Falls Machine Company, Seneca Falls, N. Y., a corporation of Massachusetts Application May 7, 1949, Serial No. 91,984

1 Claim. (Cl. 74—388)

This invention relates to a power actuator or servo-motor by which a continuously moving power member may be rendered operative or inoperative with respect to a member to be driven by the functioning of a relatively small pilot or control device.

In the preferred construction, a power shaft is continuously rotated from any convenient source of power and is coupled to turn an output shaft as determined by the pilot or control device.

It is the general object of my invention to provide improved control means by which the power shaft may be selectively rendered operative or inoperative with respect to the output shaft and under the control of the pilot device.

A further object is to provide such a construction in which the pilot device does not function to drive the output shaft direct but operates under very light load and only to selectively connect the power shaft to the output shaft.

I also provide a construction in which a continuously rotated power shaft may be selectively connected to turn the output shaft under pilot control in either direction.

My invention further relates to arrangements and combinations of parts which will be hereinafter described and more particularly pointed out in the appended claim.

A preferred form of the invention is shown in the drawings, in which

Figure 1:
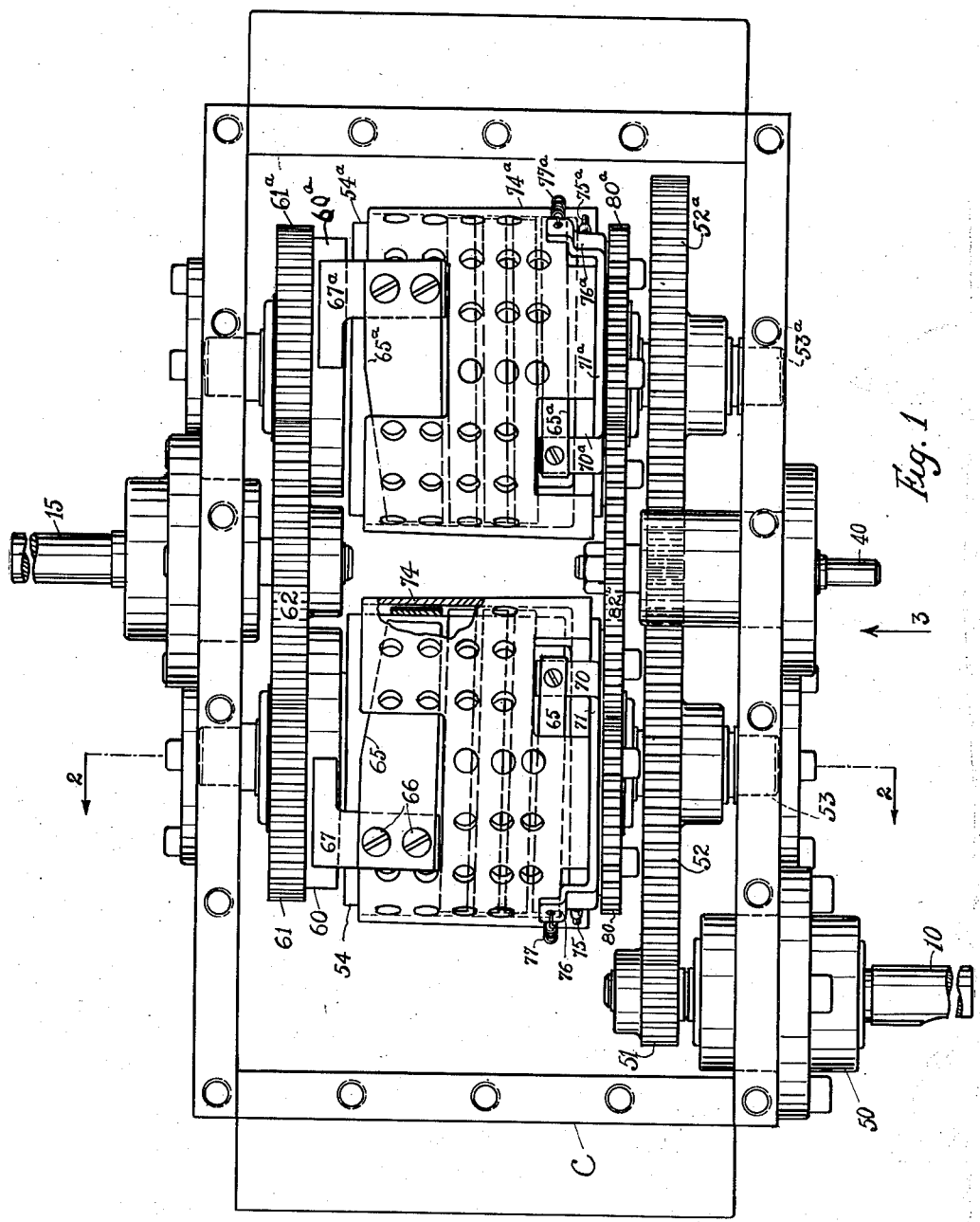
Fig. 1 is a plan view of my improved power actuator.

Referring to the drawings, my improved power actuator in its preferred form comprises a casing C supporting an input or power shaft 10 which is continuously rotated by a motor M (Fig. 5) through a pinion 11 and gear 12, or which may be rotated from any other convenient source of power. An output shaft 15 is also mounted in the casing C and is normally stationary, but is rotated when coupled to the power shaft 10 through the control device to be described.

In the preferred form, the output shaft 15 may be selectively rotated in either direction as determined by the control device, but for some purposes, rotation of the output shaft in a single direction only has utility.

In the illustrative diagram (Fig. 5), the invention is shown as controlling the transverse position of a lathe tool T with respect to a rotated piece of work W, as in a contour lathe. The tool T is mounted on a cross slide 20 slidable crosswise on a carriage 22 which is moved longitudinally of the work on guideways 23 and 24.

A pattern plate P is mounted in fixed position and coacts with a detector or follower 25 pivoted at 26$^a$ on the cross slide 20 and having an insulated index arm 26 connected to a line wire L.

The free end of the arm 26 makes selective contacts with terminals 30 and 31 which are connected to a relatively small control motor M' through wires 32 and 33. The motor M' is also connected to a second line wire L' and is of the reversible type which will be rotated clockwise or anti-clockwise according as one or the other of the contacts 30 and 31 is engaged by the arm 26 under control of the pattern plate P.

The motor M' is connected through reduction gearing G to a control shaft 40 rotatably mounted in a suitable bearing secured to the front of the casing C. The output shaft 15 is shown as provided with a pinion 42 engaging a rack 44 mounted on the carriage 22.

The operation of this illustrative mechanism may be briefly described as follows:

As the carriage 22 is moved longitudinally along the guideways 23 and 24, the detector or follower 25 follows the contour of the fixed pattern plate P. As the contour changes, the arm 26 swings to the right or left to engage one or the other of the contacts 30 and 31. This causes the motor M' to rotate the control shaft 40 either clockwise or anti-clockwise. This movement of the shaft 40 then causes the power shaft 10 to rotate the output shaft 15 and pinion 42 in the same direction through mechanism to be described, thus moving the tool T toward or away from the work W under the control of the pattern plate P, detector 25 and motor M'.

Figure 5:
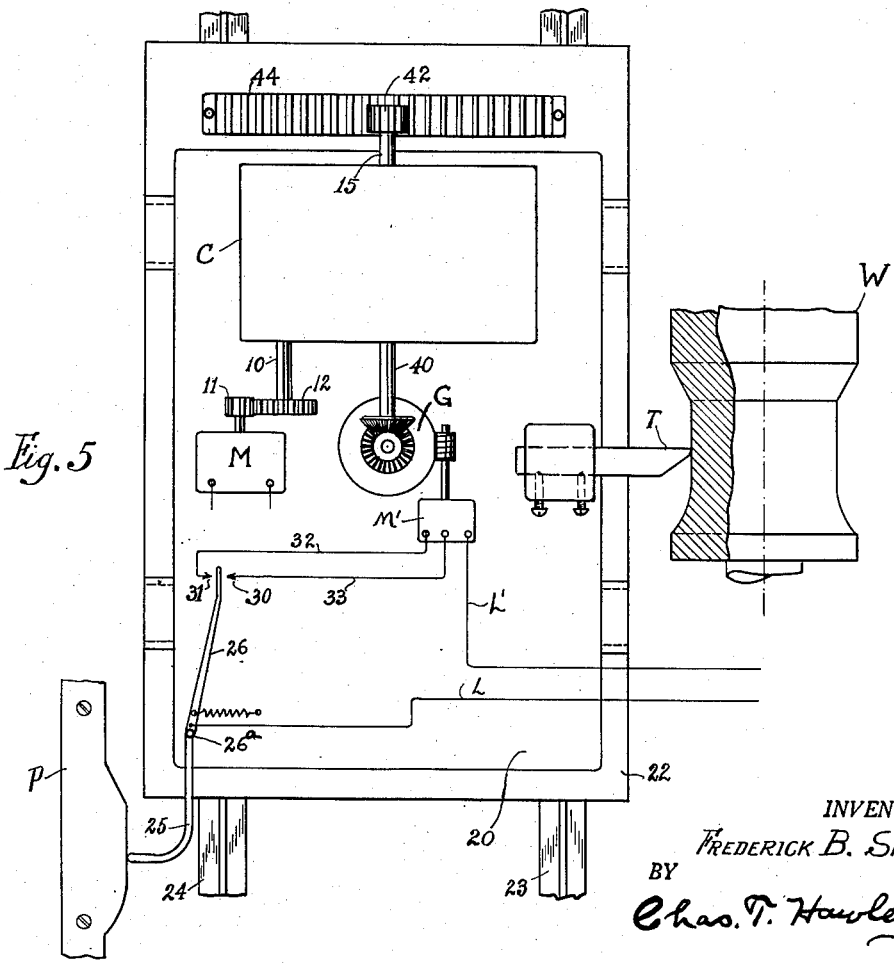
Fig. 5 is a diagrammatic view illustrating the application of my invention to contour lathe operation.

It will be understood that the application of the invention shown in Fig. 5 and above described is illustrative only, and that the invention is well adapted for more general application.

Having made clear a desired result to be obtained by use of my improved power actuator, the details of construction of the power actuator will now be described.

Figure 2:
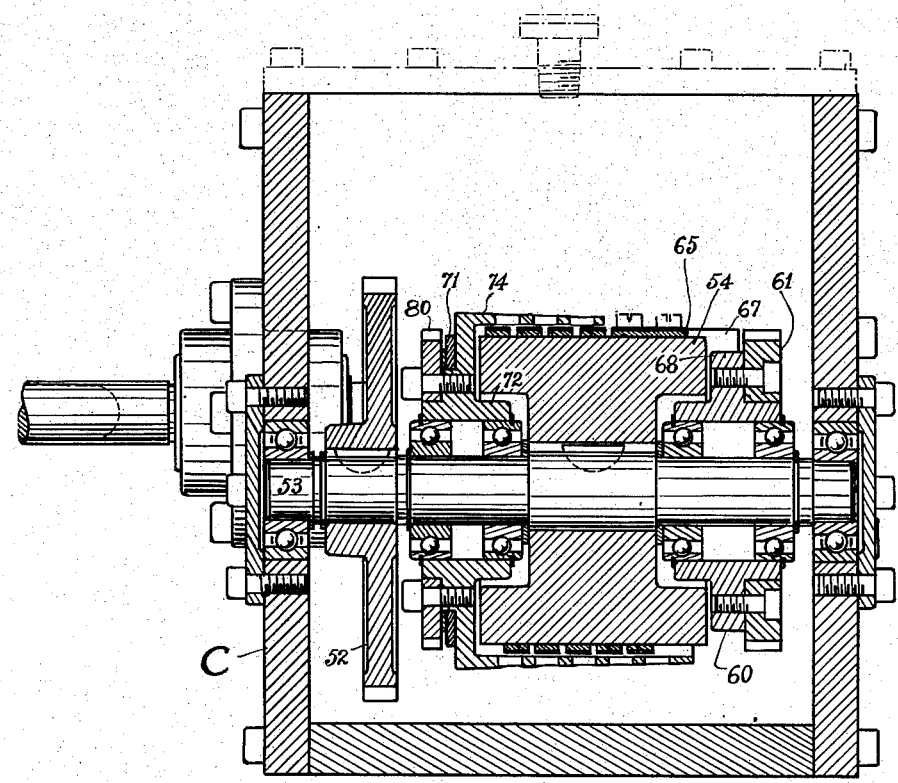
Fig. 2 is a sectional elevation, taken along the line 2—2 in Fig. 1.
Figure 3:
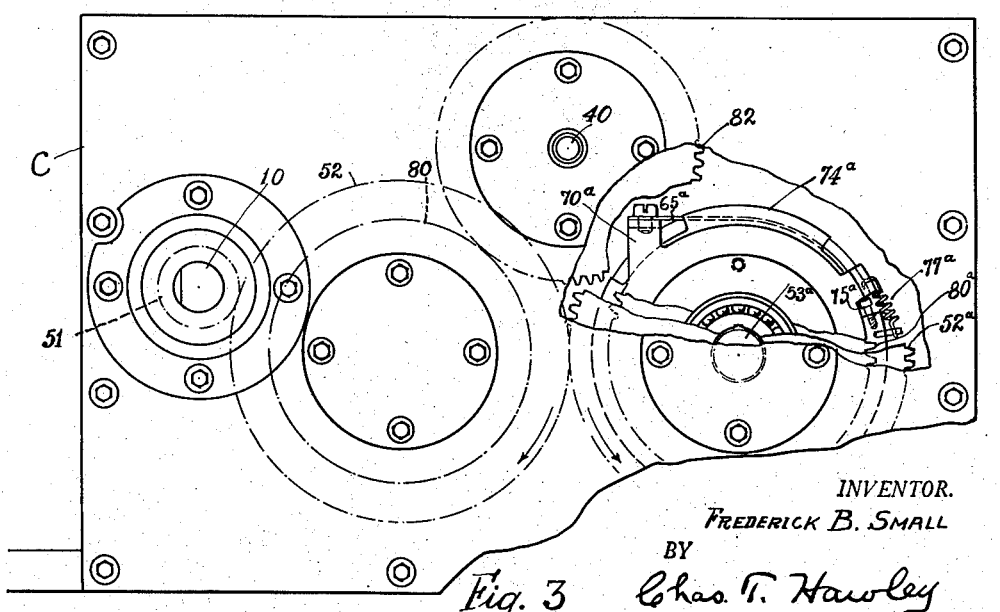
Fig. 3 is a front elevation, looking in the direction of the arrow 3 in Fig. 1 and with a portion of the front casing broken away.

Referring particularly to Figs. 1 and 2, the power shaft 10 is mounted in a bearing 50 fixed to the front of the casing C and at its inner end is provided with a pinion 51 engaging a large gear 52 which is mounted on a shaft 53 (Fig. 2) freely-rotatable in bearings in the casing C and supporting and rotating a driving drum 54. The gear 52 meshes with and drives a second and similar gear 52a (Fig. 1) mounted on a second freely-rotatable shaft 53a which supports a second drum 54a.

All of the parts associated with the gears 52 and 52a are duplicates, except for being in some cases right and left hand, and the two drum shafts and drums are continuously rotated from the power shaft 10 at equal speeds but in opposite directions.

Referring to Fig. 2, a flanged collar 60 is freely rotatable on the drum shaft 53 and supports a gear 61 secured thereto. A similar gear 61a (Fig. 1) is rotatably mounted on the drum shaft 53a, and the gears 61 and 61a both engage a gear 62 fixed on the inner end of the output shaft 15. Either gear 61 or 61a will turn the gear 62 when it is connected to its associated drum, as will now be described.

A tapered driving bang 65 is coiled spirally around the drum 54, and the wide end of the band is fastened by screws 66 (Fig. 1) to a bracket 67 which is firmly secured to a lug or projection 68 on the flanged collar 60. The narrow end of the band 65 is secured to an arm 70 (Fig. 1) extending laterally from a disc or flat ring 71.

The disc or ring 71 is loosely mounted but frictionally held on the hub 72 of a perforated cylindrical hollow cage 74, surrounding the driving band 65 and having slight clearance relative thereto when the band engages the drum 54. The tightness of the band relative to the drum may be adjusted by a screw 75 on the cage 74 which engages an arm 76 on the disc 71. The arm 76 is held yieldingly against the adjusting screw 75 by a spring 77.

A gear 80 is secured to the hub 72 of the cage 74, and the gear 80 is engaged by a gear 82 secured to the inner end of the control shaft 40.

Figure 4:
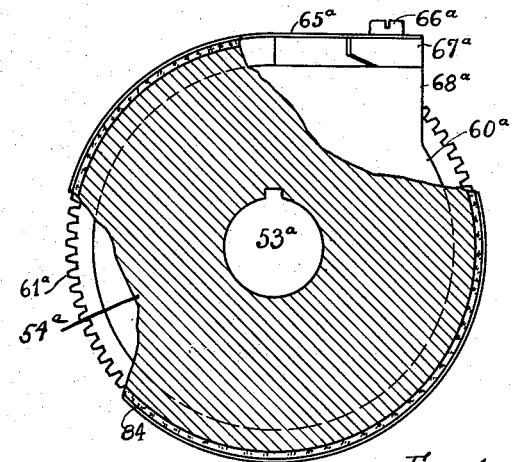
Fig. 4 is a front elevation of certain parts of a spiral band connection.

A similar band 65a is secured to a bracket 67a (Fig. 4) mounted on a lug or projection 68a of the flanged collar 60a. A cage 74a supports a disc 71a having an arm 70a to which the narrower end of the band 65a is secured. A gear 80a fixed to the cage 74a is also engaged by the gear 82 on the control shaft 40. An adjusting screw 75a and spring 77a are provided as previously described. Each band 65 and 65a preferably has an inner facing 84 (Fig. 4) of cork or of some other friction material.

Having described the details of construction of my improved power actuator, the operation and utility thereof will now be explained.

Under normal conditions, the power shaft 10 will be continuously rotated and, through the gears 51, 52 and 52a, will continuously rotate the drum shafts 53 and 53a and the drums 54 and 54a. It will be noted, however, that the drum shafts and drums are rotated in opposite directions. The output shaft 15 remains stationary so long as the control shaft 40 also remains stationary.

If the shaft 40 is turned anti-clockwise by the control motor M', the gear 82 will turn the gears 80 and 80a clockwise, and the gear 80 will correspondingly turn the disc 71 and arm 70 and the attached end of the band 65 in a clockwise direction, thus tightening the band on the rotating drum 54.

The continuously-rotating, power-driven drum 54 will then pick up and rotate the band 65, thus dragging the bracket 67, flanged collar 60 and gear 61 in a clockwise direction, and thereby rotating the gear 62 and the output shaft 15 anti-clockwise until the bracket 67 has been moved far enough to loosen the band 65 from the drum 54.

The output shaft 15 will then come to rest in its new position, which corresponds to the angular movement given to the control shaft 40 by the control motor M' as indicated by the pattern plate P.

During this operation, the parts associated with the second drum shaft 53a and the second drum 54a will be correspondingly and oppositely rotated, but such opposite rotation will not tighten the band 65a on the drum 54a, so that the drum shaft 53a and drum 54a will be inoperative to move the output shaft 15 or to retard movement thereof. If, however, the control motor M' turns the control shaft 40 in a clockwise direction, conditions will be reversed, the band 65a will grip the drum 54a, and the output shaft 15 will be turned clockwise to correspond to the clockwise movement of the control shaft 40.

During these adjusting and regulating movements, the arms 76 and 76a on the discs 71 and 71a remain engaged with the adjusting screws 75 and 75a, and the discs operate as if integral with the gears 80 and 80a and with the cages 74 and 74a.

By the use of my improved power actuator, the power for turning or adjusting the output shaft 15 is derived directly from the power shaft 10, and the control shaft 40 acts only to connect the selected drum shaft to the output shaft 15 for such interval as is indicated by the control movement of the shaft 40. Consequently, the shaft 40 turns very easily, and the reversible control motor M' may be of such relatively small size that it can be easily controlled by the pattern plate P and the detector 25.

The cages 74 and 74a act to limit the clearance between the drums and the bands and to equalize the clearance along the length of each band as the band is loosened. If the bands are of spring steel, the cages may sometimes be omitted. The drums are preferably hardened and polished.

Having thus described my invention and the advantages thereof, I do not wish to be limited to the details herein disclosed, otherwise than as set forth in the claim, but what I claim is:

A driving mechanism comprising a continuously rotated power shaft, a pair of drums and drum shafts mounted in parallel spaced relation and adjacent said power shaft, equal gears secured on said drum shafts and intermeshing, a pinion on said power shaft operatively engaging one of said equal gears to rotate said drum shafts and drums continuously and at equal reduced speeds but in opposite directions, a normally stationary output shaft mounted parallel to and between said drum shafts and equally spaced therefrom, a normally stationary band encircling each drum but normally free therefrom, transmission gears mounted on said drum shafts but loose therefrom, a gear on said output shaft engaged by both of said transmission gears, an operative connection from one end of each band to its associated transmission gear, a normally stationary control shaft mounted parallel to and between said drum shafts, a band-tightening gear loose on each drum shaft, an operative connection from each band-tightening gear to the second end of each of said bands, a gear on said control shaft engaging both of said band-tightening gears, power means to displace said control shaft angularly, and pattern-controlled selective mechanism to control said power means, said control shaft when displaced angularly in a selected direction being effective through one of said band-tightening gears to tighten the associated band on its drum, and said drum being thereby rendered effective through said band and its associated transmission gear to turn said output shaft in a coordinated direction until movement of said control shaft ceases and until said band is loosened by further movement of the associated drum.

FREDERICK B. SMALL.

REFERENCES CITED

The following references are of record in the file of this patent:

UNITED STATES PATENTS

| Number | Name | Date |
|---|---|---|
| 730,724 | Weimar | June 9, 1903 |
| 1,935,683 | Wemp | Nov. 21, 1933 |
| 2,370,585 | Scott et al. | Feb. 27, 1945 |
| 2,398,500 | Jaeger | Apr. 16, 1946 |
| 2,476,214 | Parsons | July 12, 1949 |

FOREIGN PATENTS

| Number | Country | Date |
|---|---|---|
| 25,120 | Great Britain | Oct. 27, 1910 |
| 526,314 | Great Britain | Sept. 16, 1940 |
| 715,347 | Germany | Dec. 19, 1941 |